United States Patent [19]

Mazzurco et al.

[11] 4,437,636
[45] Mar. 20, 1984

[54] SELF-ORIENTATING FLUID CONTAINER DEVICE

[75] Inventors: Anthony Mazzurco, 7 Elsmere Pl., East Northport, N.Y. 11731; Richard L. Miller, Dix Hills, N.Y.

[73] Assignee: Anthony Mazzurco, East Northport, N.Y.

[21] Appl. No.: 348,219

[22] Filed: Feb. 12, 1982

[51] Int. Cl.³ .............................................. A47F 5/12
[52] U.S. Cl. ..................................... 248/137; 248/142
[58] Field of Search ................... 248/137, 138, 142; 211/81

[56] References Cited

U.S. PATENT DOCUMENTS

| 261,956 | 8/1882 | Rinker | 248/142 |
| 392,105 | 10/1888 | Chapman | 248/138 |
| 1,175,739 | 3/1916 | Florer | 248/142 |
| 4,248,397 | 2/1981 | Casper | 248/138 |

FOREIGN PATENT DOCUMENTS

| 574212 | 7/1924 | France | 248/137 |
| 2415443 | 9/1979 | Switzerland | 248/142 |

Primary Examiner—J. Franklin Foss
Assistant Examiner—Sarah A. Lechok
Attorney, Agent, or Firm—Richard L. Miller

[57] ABSTRACT

A self-orienting fluid container device, including a stationary base, an outer gimbal supported on the base, an inner gimbal frame supported on the outer gimbal carrying a cup, and a lock for selectively locking the base, the outer gimbal ring and inner gimbal frame from freely pivoting respective to each other.

4 Claims, 4 Drawing Figures

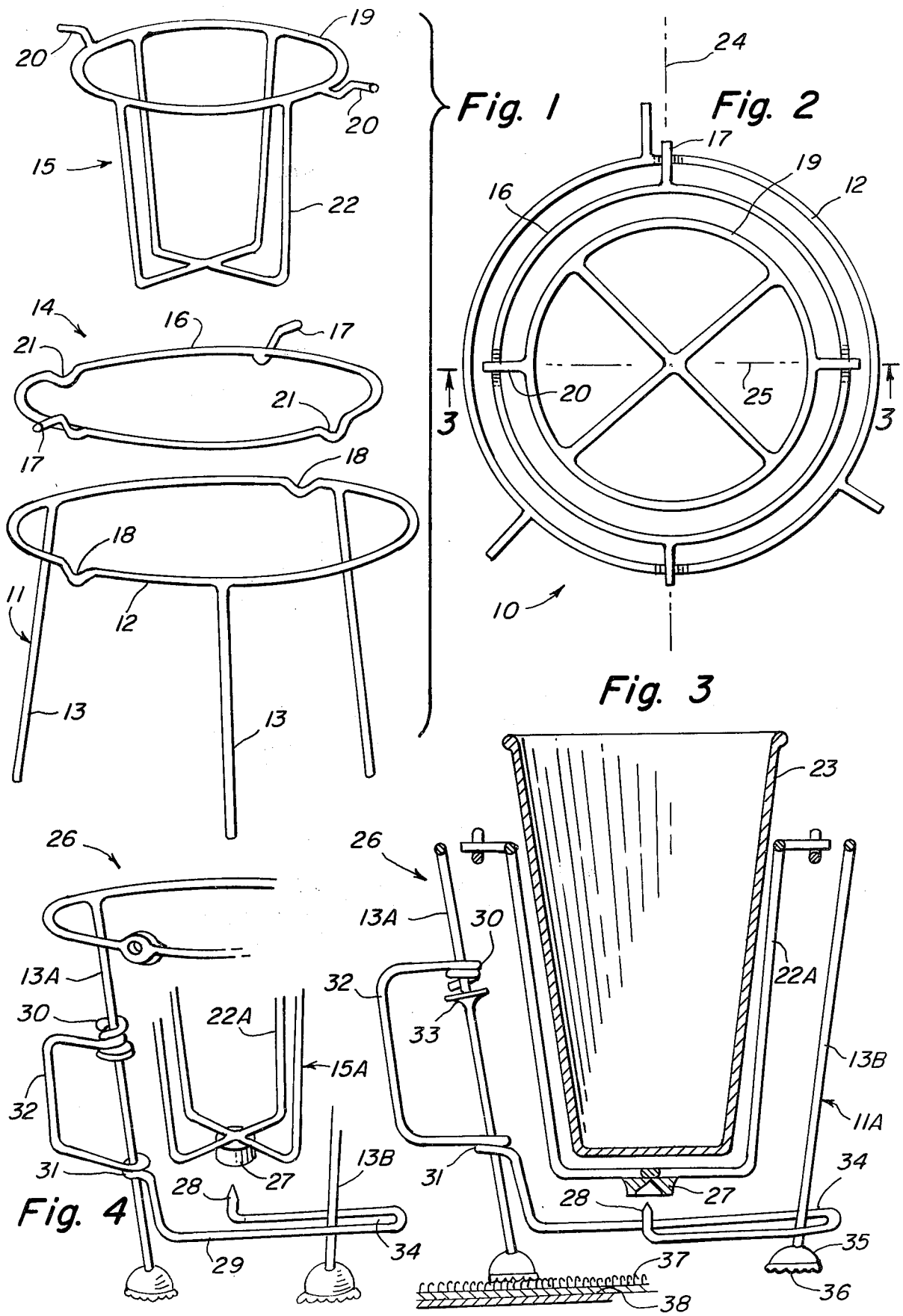

SELF-ORIENTATING FLUID CONTAINER DEVICE

This invention relates generally to holders used to support open vessels containing liquids.

BACKGROUND OF THE INVENTION

It is well known that when a filled, open vessel, such as a drinking glass, is rested down in a moving vehicle such as a boat, an automotive vehicle or railroad train, there is always a possibility of the vehicle motion spilling some of a liquid over the rim of the vessel, and which accordingly makes it difficult for persons to dine while travelling in a moving vehicle. Many persons such as truck drivers and others depend a great deal on having an occassional refreshing beverage, while the vehicle travels on, so that resting down a partly filled drinking cup between sips becomes a problem.

SUMMARY OF THE INVENTION

Therefore it is a principal object of the present invention, to provide a fluid container device which is self-orienting in response to any movement of a supporting surface upon which it is rested, so that if the supporting surface is vibrated or otherwise suddenly moved, the device will neutralize the effects of such movement for a liquid contained in a vessel of the device and prevent the same from spilling or splashing out.

Another object is to provide a self-orienting fluid container device, which may be made in different sizes so as to accommodate different sizes or shapes of liquid-contained, open-topped vessels.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in specific construction illustrated and described within the scope of the appended claims.

BRIEF DESCRIPTION OF THE DRAWING FIGURES

The figures on the drawings are briefly described as follows:

FIG. 1 is an exploded perspective view of the invention components.

FIG. 2 is a top plan view thereof shown reassembled.

FIG. 3 is a side cross sectional view on line 3—3 of FIG. 2, of a modified design showing an automatic means for locking the gimbel from pivoting when lifted by a handle.

FIG. 4 is a detail partial perspective view of structure shown in FIG. 3.

DETAILED DESCRIPTION OF THE PREFERRED EMBODIMENT

Referring now to the drawing in greater detail, and more particularly to FIGS. 1 and 2 thereof, at this time the reference numeral 10 represents a self-orienting fluid container device according to the present invention, wherein there is a stationary base 11 for being rested upon any horizontal surface of a moving vehicle or the like. The base comprises a wire frame made of a circular ring 12 and three downwardly legs 13 affixed thereto. An outer gimbal ring 14 is supported freely pivotable on the base, and an inner gimbal ring frame 15 is supported freely pivotable on the outer gimbal ring. The outer gimbal ring is a circular wire 16 having a pair of radially outwardly extending spurs 17 affixed to diametrically opposite sides thereof, and which are rested in a pair of notches 18 formed on diametrically opposite sides of the ring 12. The inner gimbal frame 15 is comprised of wire frame and includes a circular ring 19 having radially outwardly spurs 20 on diametrically opposite sides thereof which are rested in notches 21 on diametrically opposited sides of the ring 16; the notches 21 being spaced 90 degrees from the spurs 17. The inner gimbal frame 15 additionally includes a downwardly depending wire basket 22 formed affixed to the ring 19, and which serves for support of a removable drinking cup 23 therein.

In operative use, the gimbal ring 16 is thus free to swing or sway about an axis 24, while the gimbal ring 19 is free to sway or swing about an axis 25, so that the combination produces a universally free swing or sway of the frame 15 and its supported cup respective to the stationary base, thus preventing spill or splash of liquid from the cup when the base is suddenly jarred.

In a modified design 26 of the invention, shown in FIGS. 3 and 4, the frame 15A additionally includes an inverted receptacle 27 formed under a center of the basket 22A so as to be engagable with a vertically upward prong 28 formed on a wire member 29 carried on the base 11A. The member 29 is vertically slidable on the base so as to selectively be engaged or disengaged with the receptacle 27. Accordingly the member 29 is made with a pair of windings 30 and 31 that wrap around one of the legs 13A; a portion of the wire member 29 located between the windings extending outwardly so as to form a handle 32 that may be grasped in a person's hand; and which when lifted in a hand, causes the prong to engage the receptacle, and thus lock the gimbal rings from freely swinging, so that the cup, thus can be raised to a person's lips for drinking therefrom, with the cup being tilted, instead swinging freely into a vertical position. However, when the cup is removed from the person's lips and the device 26 is again rested upon a supporting surface of the vehicle, the prong drops out of the receptacle so as to allow the cup to freely swing again. In its downwardly freely slided position, the winding 30 of the member 29 rests upon a collar 33 stationarily affixed to the leg 13A. A narrow loop 34 formed on the member 29 extends around another leg 13B so to prevent rotation of the member 29 on the frame of the base, whereby the prong and receptacle always align, and the handle 32 always extends outwardly for convenient grasp.

In this design the base 11A additionally includes foot members 35 on a lower end of each of the base legs; an underside of each foot member having a loop pile fastener 36 attachable to a loop pile fastener mating 37 affixed on an upper side of the supporting surface 38 provided for the device on the vehicle.

While certain novel features of this invention have been shown and described and are pointed out in the annexed claims, it will be understood that various omissions, substitutions and changes in the forms and details of the device illustrated and in its operation can be made by those skilled in the art with out departing from the spirit of the invention.

I claim:

1. A self-orienting fluid container device, comprising in combination, a stationary base having an outer support ring, support legs depending from said outer support ring and a 1st pair of diametrically opposed notches formed in said outer support ring; an outer gimbal frame having an outer gimbal ring with a 1st pair of radially outwardly extending diametrically opposed spurs which pivotally seat in said 1st pair of opposed notches, and a second pair of diametrically opposed notches formed in said outer gimbal ring spaced 90 degrees from said 1st pair of spurs; an inner gimbal frame having an inner gimbal ring with a second pair of radially outwardly extending diametrically opposed spurs which pivotally seat in said second pair of opposed notches, and a depending basket for removably supporting a fluid container; and a selective locking mechanism for automatically retaining the fluid container in a fixed orientation when grabbed for drinking, comprising an inverted receptacle positioned on the bottom of said basket, a handle slidably coupled to a support leg for lifting the device to raise the fluid container for drinking, an arm extending from said handle, and an upwardly extending prong at the end of said arm, said prong engaging said receptacle with the lifting of the handle to prevent rotation of the container with respect to the device whenever it is desired to lift the container, and said prong disengaging from said receptacle upon lowering of said handle to replace the device, whereby the device will pivot in mutually orthogonal axes to maintain the container in a vertical orientation when placed down and the device will keep the container fixed when picked up.

2. A device as in claim 1, wherein said arm comprises a loop passing around another leg to prevent rotation of said arm.

3. A device as in claim 1, and comprising a collar formed along the support leg supporting said handle, to limit the downward sliding of said handle along its support leg.

4. A device as in claim 1, and further comprising loop pile fastener means at the distal ends of said support legs attachable to mating fasteners on a support surface.

* * * * *